United States Patent [19]

Haley

[11] 4,330,941
[45] May 25, 1982

[54] MEASURING LINEAR DISPLACEMENT OF AN OBJECT

[76] Inventor: Ernest K. Haley, 1210 Old Cannons La., Louisville, Ky. 40205

[21] Appl. No.: 188,570

[22] Filed: Sep. 18, 1980

[51] Int. Cl.³ ............................ G01B 3/12; G01B 5/04
[52] U.S. Cl. .................................................. 33/141 F
[58] Field of Search ............ 33/134 R, 141 R, 141 F, 33/125 M, 129

[56] References Cited

U.S. PATENT DOCUMENTS

| | | | |
|---|---|---|---|
| 1,579,260 | 4/1926 | Tiller | 33/134 R |
| 2,077,146 | 4/1937 | Hart | 33/141 B |
| 3,050,857 | 8/1962 | Pierce et al. | 33/141 B |
| 3,688,410 | 9/1972 | Zeidler et al. | 33/142 |
| 3,758,954 | 9/1973 | Teplitz | 33/141 F |
| 4,068,384 | 1/1978 | Holy et al. | 33/141 F |

FOREIGN PATENT DOCUMENTS

| | | | |
|---|---|---|---|
| 635197 | 4/1950 | United Kingdom | 33/134 R |
| 1021535 | 3/1966 | United Kingdom | 33/141 F |

Primary Examiner—Harry N. Haroian
Attorney, Agent, or Firm—Larson and Taylor

[57] ABSTRACT

A measuring system and method is disclosed for accurately measuring the linear displacement of a longitudinal object having a straight longitudinal side, such as the displacement of a steel beam moving on a conveyor. The linear displacement of the object is measured by a metering device. The metering device includes a support frame, a plurality of spaced pulleys mounted on the frame, a continuous loop trained for travel around the pulleys with a portion of the path of travel of the loop extending parallel to the straight side of the object, and magnets or the like around the periphery of the loop to releasably attach the loop to the object. The measurement of the linear displacement of the object is provided by converting the movement of the loop to indicate the linear movement of the object. Preferably, two metering devices are positioned on either side of a limit switch. Each metering device is reciprocally movable so that as the object approaches the limit switch, the metering device on that side is moved to engage the object. When the object contacts the limit switch, the measurement of the linear displacement of the object is initiated using the metering device in contact with the object. When the object is opposite the other metering device, the other metering device is moved into contact with the object. By using two metering devices, the linear displacement of the object is continued after the object is no longer in contact with the first metering device.

8 Claims, 6 Drawing Figures

MEASURING LINEAR DISPLACEMENT OF AN OBJECT

FIELD OF THE INVENTION

This invention relates generally to the measurement of the position of a linear object and more particularly to the accurate measuring of the linear displacement of a longitudinal object having a straight side as it moves on a conveyor past a work station.

BACKGROUND OF THE INVENTION

During the manufacture and fabrication of steel beams and the like, the steel beam must be accurately positioned to be cut, punched, drilled, sheared, or even welded. These steel beams vary from four inches to forty inches wide and can be up to sixty-five feet long. In addition, the steel may be hot where it is being cut at the steel mill. One prior art system which has been used to measure the linear displacement of a steel beam includes a pinch roller. The pinch roller is pressed against the beam and an electronic encoder on the pinch roller counts the distance that the beam moves. However, as the wear on the roller constantly reduces the diameter of the roller, this diameter must be checked every day and the wear compensated for. U.S. Pat. No. 3,556,368 discloses a measuring system of this type having conveying and measuring pinch rollers located on either side of a work station. Another more common system uses a rack and gear. However, this system also must be compensated for wear. Also, when this system is used on a conveyor, material cannot be taken off the side of the conveyor that the measuring system is located on.

A number of measuring systems have also been disclosed in the prior art for measuring lengths of linear material. For example, in U.S. Pat. No. 3,758,954 to Teplitz, a measuring apparatus for bridge wire strands is disclosed. This apparatus includes a calibrated tape traveling around a plurality of pulleys and in contact with the wire strand along a portion of the travel. A separately mounted chain with magnets located inside of the tape is used to clamp a portion of the tape to the wire strand as it passes by. Another linear position measuring device is disclosed in U.S. Pat. No. 4,068,384 to Holly et al. This device is designed for use with a conveyor and includes a magnetic strip which is bonded to a side of the conveyor. A steel belt travels between two pulleys and a portion of the steel belt is held magnetically to the magnetic strip. A measuring device on one pulley is then used to measure the movement of the steel belt and thus the movement of the conveyor. A linear measuring system for precisely measuring distances along a rather long measurement axis is disclosed in U.S. Pat. No. 4,091,541 to DiCiaccio. In this system, the object is attached to a mechanical coupler. An endless measuring cable is attached to one side of the coupler and travels around an idler drum and a measuring drum and back to the other side of the coupler. As the object moves, a rotary encoder produces a digital output signal in response to the movement of the measuring drum. Still another measuring system for measuring the length of a web, such as a floor covering or the like, is disclosed in U.S. Pat. No. 4,195,410 to Strohmeyer. This device uses a measuring roller which is directly coupled to a measuring mechanism. While the devices disclosed above may be suitable for the particular environment in which they are found, these devices are not suitable for measuring variable sized steel beams and the like.

SUMMARY OF THE INVENTION

In accordance with the present invention, a measuring system and method is provided with a metering device for measuring the linear displacement of a longitudinal object. The metering device includes a frame, a plurality of spaced pulleys, a continuous loop trained for travel around the pulleys with a portion of the path of travel of the loop extending parallel to the straight side of the object, and means to releasably attach the loop to the object along the parallel portion of the path of the traveling loop. A means is also provided to convert the movement of the loop to indicate the linear movement of the longitudinal object. In order to measure objects of various sizes, the metering device is reciprocally moved toward and away from the straight side of the object. A limit switch is also provided to initiate measurement of the linear displacement of the object after the metering device is in contact with the object.

According to a preferred embodiment, two metering devices are provided on either side of the limit switch. In this manner, the linear displacement of the object can be measured on either side of the limit switch. In this embodiment, the loop of the metering device has a chain and magnets are located about the periphery of the chain to releasably attach the chain to the object. An air cylinder and spring means is also used to resiliently urge the metering device into contact with the object.

Other features and advantages of the present invention are stated in or apparent from the detailed description of a presently preferred embodiment of the invention found hereinbelow.

DETAILED DESCRIPTION OF THE PREFERRED EMBODIMENTS

Figure 1:
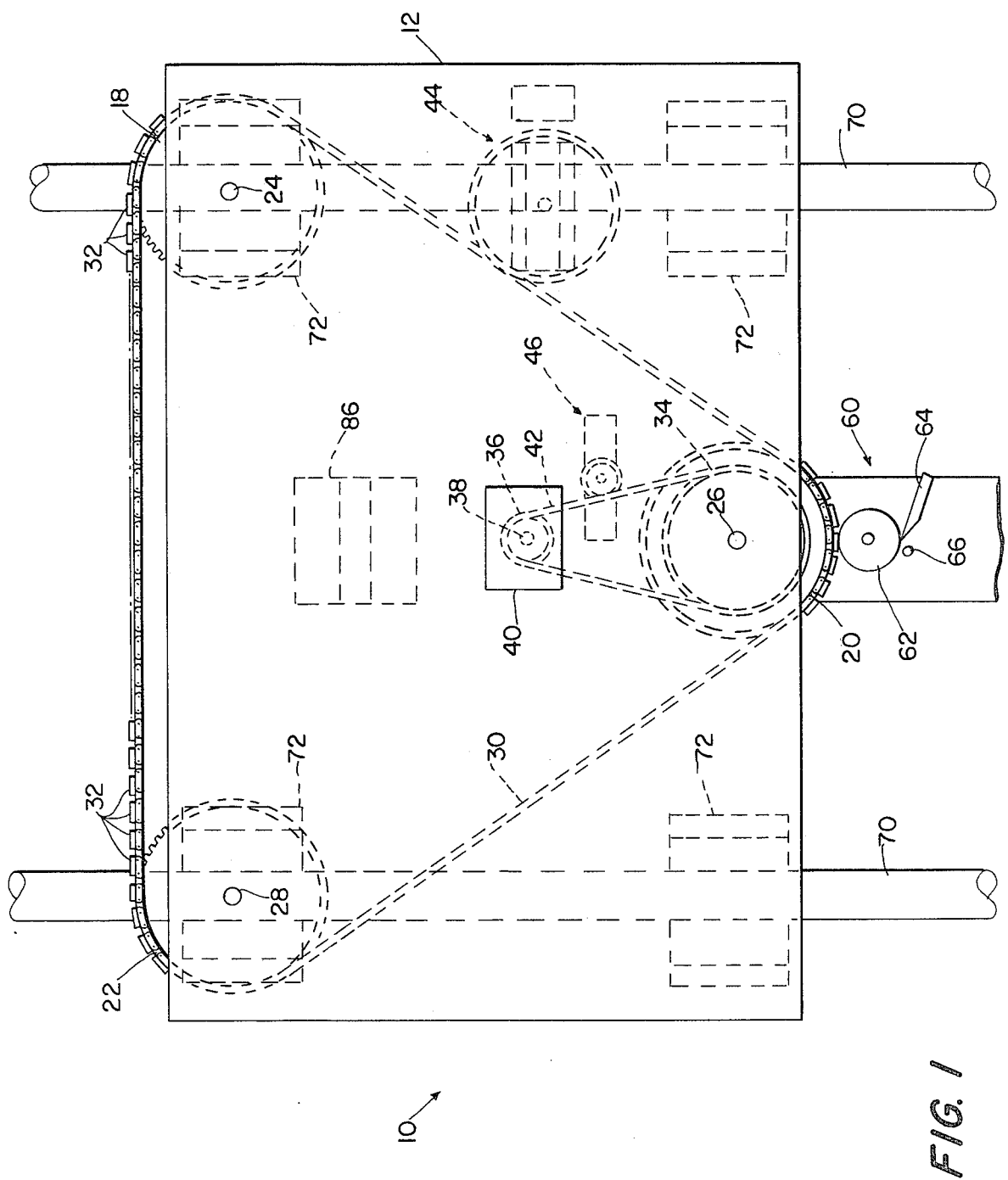
FIG. 1 is a schematic top view of a metering device of the present invention.
Figure 2:
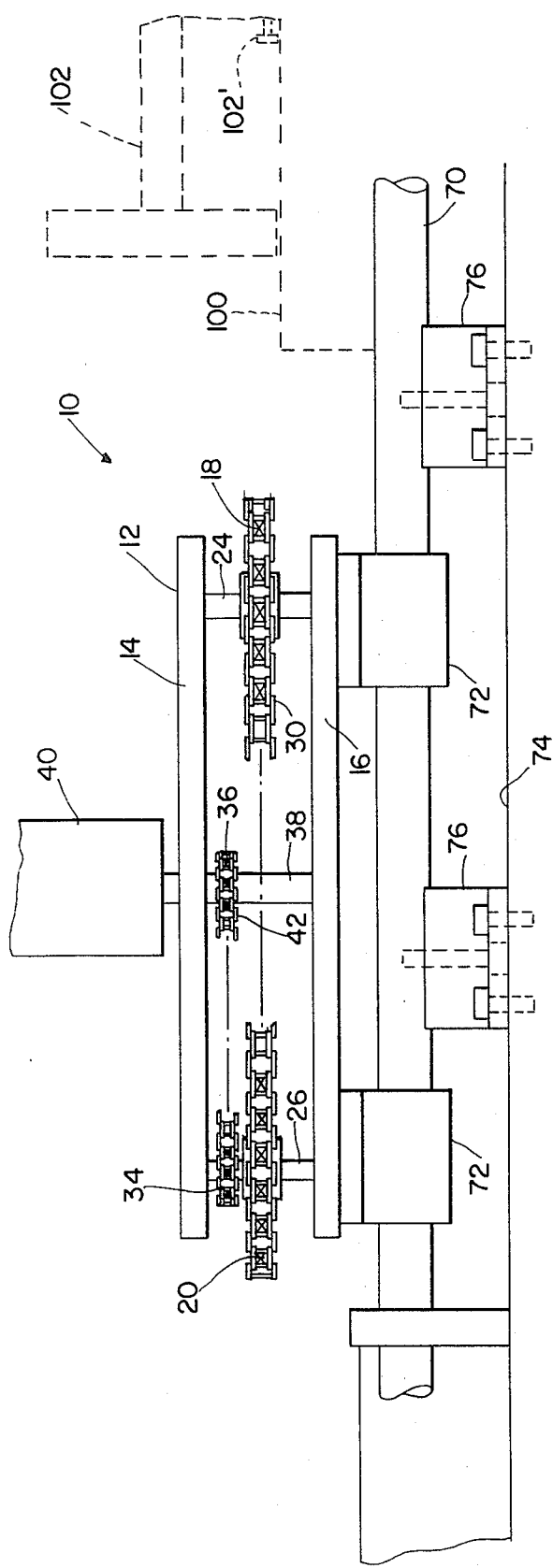
FIG. 2 is a schematic side view of the metering device depicted in FIG. 1.

With reference to the drawings in which like numerals represent like elements throughout the several views, a presently preferred embodiment of metering device 10 of the present invention is depicted in FIGS. 1 and 2. Metering device 10 includes a frame 12 having a top plate 14 and a bottom plate 16. Located between top plate 14 and bottom plate 16 are three pulleys 18, 20, and 22. Pulleys 18, 20, and 22 are rotatably mounted about shafts 24, 26, and 28 respectively. A continuous loop 30 is trained for travel around pulleys 18, 20, and 22. Located about the periphery of continuous loop 30 are a series of grippers 32. As shown, the portion of continuous loop 30 traveling between pulleys 18 and 22 represents the front-most portion of metering device 10.

Also rotatably located about shaft 26 is a first encoder pulley 34. First encoder pulley 34 is mechanically attached to pulley 20 such that pulleys 20 and 34 rotate as a unit. Spaced from first encoder pulley 34 is a second encoder pulley 36 which is rigidly attached to an encoder shaft 38. Encoder shaft 38 passes through top plate 14 and into an encoder 40 which is mounted to top plate 14. An encoder continuous loop 42 is positioned for travel about first and second encoder pulleys 34 and 36. Shown schematically in FIG. 1 is a take-up mechanism 44 which engages and maintains a constant tension on continuous loop 30. Also shown schematically in FIG. 1 is a take-up mechanism 46 which similarly engages and maintains a constant tension on encoder loop 42. As take-up mechanisms for continuous loops are well-known in the art, these mechanisms will not be discussed further.

Figure 5:
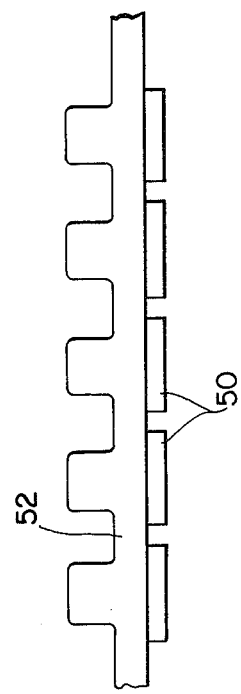
FIG. 5 is a top view of an alternative embodiment of the continuous loop of the metering device.
Figure 6:
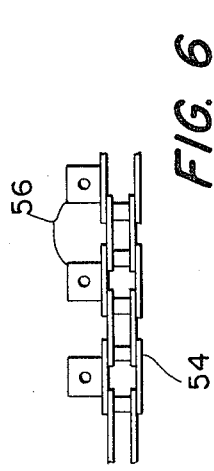
FIG. 6 is a front view of another alternative embodiment of the continuous loop of the metering device.

In the preferred embodiment of the present invention, continuous loop 30 has a series of magnets 50 located around the periphery of loop 30. In order to mount magnets 50, loop 30 can be either a timing belt 52 such as shown in FIG. 5, or a roller chain 54 with mounting pads 56 for the magnets 50 such as shown in FIG. 6. It would also be possible for continuous loop 30 to be a flat magnetic belt as well. Where continuous loop 30 does have grippers 32 which are magnetic, a cleaning device 60 is mounted adjacent pulley 20. Cleaning device 60 consists of a magnetic roller 62 which contacts the surface of magnets 50. Magnetic roller 62 picks up debris from magnets 50 and this debris is knocked off of magnetic roller 62 by a brass bar 64 which rubs across magnetic roller 62 and an air blower 66 adjacent brass bar 64 which blows the debris away.

Figure 3:
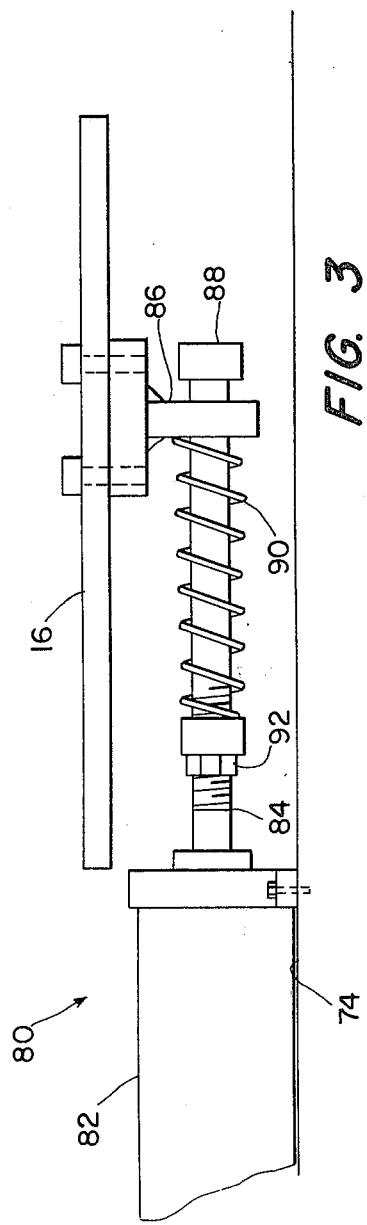
FIG. 3 is a schematic side view of the air cylinder and the spring means used to urge the metering device against the object to be measured.

As depicted best in FIG. 2, metering device 10 is reciprocally mounted on rails 70 by means of Thompson pillow blocks 72 which are attached to the underside of bottom plate 16. Rails 70 are rigidly attached to a supporting frame 74 by means of couplers 76. Depicted in FIG. 3 is a moving device 80 which reciprocally moves metering device 10. Moving device 80 includes a fluid operated cylinder and piston assembly 82 having a piston rod 84. Rigidly attached to bottom plate 16 is a push block 86 through which piston rod 84 passes. A stop 88 is attached to the end of piston rod 84 to retain piston rod 84 in push block 86. A spring 90 surrounding piston rod 84 is compressed between push block 86 and jam nut 92. Jam nut 92 is adjustably attached to piston rod 84 to vary the pushing force of spring 90. Cylinder and piston assembly 82 is rigidly attached to supporting frame 74 such that upon actuation of cylinder and piston assembly 82, metering device 10 moves appropriately.

Figure 4:
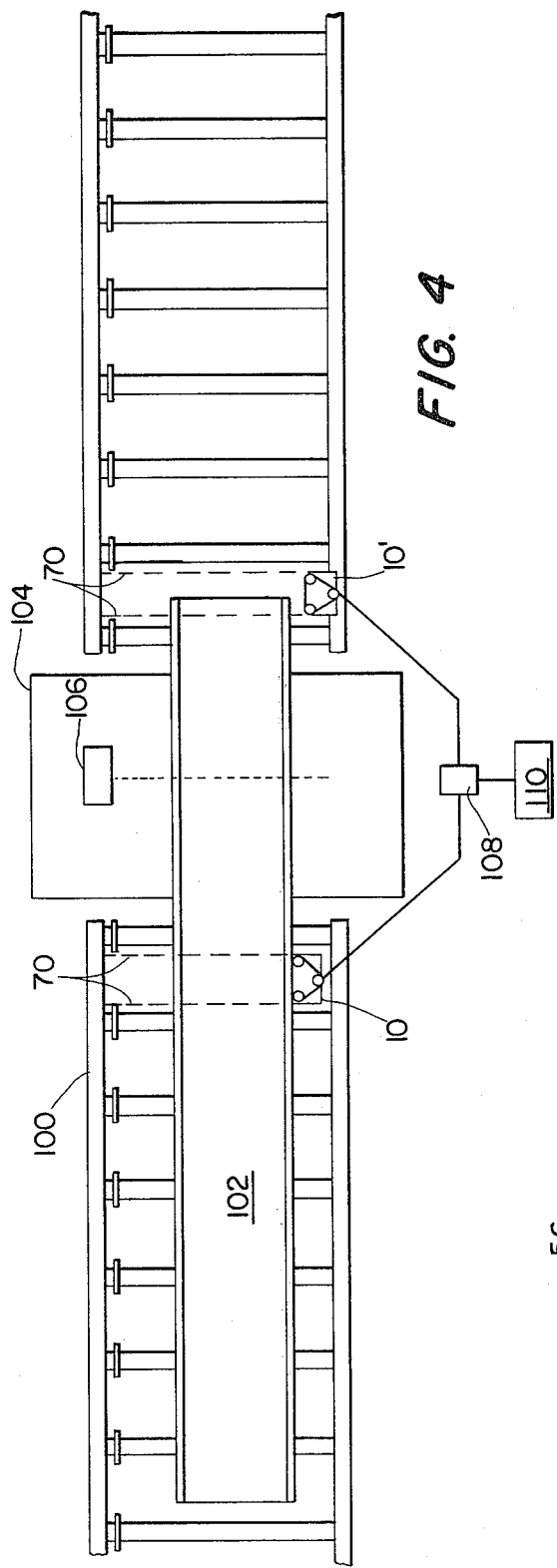
FIG. 4 is a schematic view of a conveyor using the measuring system of the present invention.

The measuring system of the present invention is depicted in FIG. 4. Shown in this figure is a roller conveyor 100 with a steel beam 102 thereon. A work machine 104 is positioned adjacent conveyor 100. Work machine 104 can be a saw, a drill, a punch, a shear, a marking machine, an angle machine, or a welder. Located at an appropriate spot with relation to conveyor 100 is a limit switch 106. Limit switch 106 is depicted in FIG. 4 and extends across the length of conveyor 100. Located on either side of work machine 104 are metering devices 10 and 10'. Metering devices 10 and 10' are mounted on rails 70 (shown in phantom) such that they move substantially the entire width of conveyor 100 to contact any sized steel beam thereon. Shown in phantom in FIG. 2 are two significantly different sized beams 102 and 102' which are contacted by metering device 10. A signal from encoder 40 located on each metering device 10 and 10' is received by an encoder control 108. A main control 110 controls the position of metering devices 10 and 10' and also displays the linear displacement information for beam 102.

The method of operation of the present invention is as follows. Initially, metering devices 10 and 10' are located in the withdrawn position. As beam 102 approaches work machine 104 from one side, for example the side on which metering 10 is located, main control 110 is used to move metering device 10 into contact with beam 102 as soon as beam 102 is opposite metering device 10. At this time, grippers 32 on continuous loop 30 come in contact with beam 102. Metering device 10 is resiliently held in place against beam 102 by means of cylinder and piston assembly 82 and spring 90. Thereafter, continuous loop 30 moves the same amount and direction as steel beam 102 does. As continuous loop 30 moves about pulleys 18, 20, and 22, encoder loop 42 located about first encoder pulley 34 and second encoder pulley 36, also moves. This causes encoder shaft 38 to move and encoder 40 to produce a signal indicative of the movement of continuous loop 30. However, the movement of steel beam 102 will not be indicated on main control 110 until limit switch 106 is tripped by the forward end of steel beam 102. As soon as limit switch 106 is tripped, encoder control 108 causes the linear displacement of steel beam 102 to be displayed on main control 110. While any reference point may be used to determine the position of steel beam 102, the easiest method is to start the measurement at zero when limit switch 106 is tripped. By use of metering device 10, the position of steel beam 102 can be very accurately determined and one or more operations of work machine 104 can be performed at the desired location. As steel beam 102 progresses to a point opposite metering device 10', metering device 10' is moved into engagement with steel beam 102 as well. At this time, both metering devices 10 and 10' generate a signal responsive to their respective loops 30 indicative of the linear displacement of longitudinal beam 102. However, encoder control 108 continues to employ the signal received from metering device 10 until steel beam 102 passes metering device 10. At this time, encoder control 108 switches over and uses the signal from metering device 10' to continue to monitor the linear displacement of steel beam 102. By use of two metering devices 10 and 10', metering devices 10 and 10' can be located out of the way of work machine 104 while still providing accurate information regarding the linear displacement to steel beam 102 even up to the trailing end of steel beam 102. After the work on steel beam 102 has been completed, steel beam 102 can be transferred off of either end of conveyor 100 and metering devices 10 and 10' are withdrawn and ready to be moved forward to monitor the linear displacement of a new beam.

When metering devices 10 and 10' are moved forward by the respective moving device 80, metering devices 10 and 10' are resiliently urged against steel beam 102. This is accomplished by maintaining a fluid pressure in cylinder and piston assembly 82 by use of a regulator valve. If steel beam 102 is not exactly parallel with the path of travel of conveyor 100 as steel beam 102 moves, metering devices 10 and 10' are also urged to move with beam 102. Thus, if beam 102 moves away from metering device 10, additional fluid supply is directed to cylinder and piston assembly 82 to move metering device 10 forward. In the same manner, if steel beam 102 moves towards metering device 10, fluid pressure is bled from cylinder and piston assembly 82 to allow metering device 10 to move back. Spring 90 on piston rod 84 helps to maintain an even pressure on push block 86 from cylinder and piston assembly 82.

In the preferred embodiment of the present invention, a series of individual magnets are located around the periphery of continuous loop 30. It should also be appreciated that these magnets could be electro-magnets. In addition, instead of magnets, a series of frictional rubber pads could be substituted therefore. These rubber pads would not slip as they traveled along the beam due to the force exerted on metering device 10 and through the rubber pads onto the steel beam by cylinder piston assembly 82. To provide even greater frictional contact with the steel beam, instead of rubber pads, rubber vacuum suction cups could be used. No matter what type of grippers 32 are used, it is important that these grippers not slip when they are in contact with the object to be measured.

As can be seen from the drawings, metering device 10 takes up very little space with respect to conveyor 100. In the preferred embodiment, the width of metering device 10 is approximately 15 inches. It should be apparent to those of ordinary skill in the art that the size of metering device 10 can be varied to suit the requirements of the user. In use, the metering device 10 depicted is capable of measuring the linear displacement of the objects to thousandths of an inch.

While the present invention has been described as measuring the longitudinal straight side of a steel beam, it should be appreciated that the present invention is capable of measuring many different objects having a straight side. Specifically, the present invention could also measure steel channels, angles, plates, pipes, shafts, or tubes. Other objects which can be measured by the present invention are also apparent to those of ordinary skill in the art.

Thus while the invention has been described in detail with respect to an exemplary embodiment thereof, it will be understood by those of ordinary skill in the art that these and other variations and modifications may be effected in the exemplary embodiment within the scope and spirit of the invention.

I claim:

1. A measuring system for accurately measuring the linear displacement of a longitudinal object having a straight longitudinal side, such as a steel beam moving on a conveyor, comprising:

a metering device including a frame; a plurality of spaced pulleys rotatably mounted on said frame; a continuous loop trained for travel around said pulleys, a portion of the path of travel of said loop extending parallel to the straight side of the object; and means to releasably attach said loop to the object along the parallel portion of the path of said loop;

means to move said metering device reciprocally toward and away from the straight side of the object, said means to move including a fluid piston and cylinder means;

means to hold said metering system resiliently against the object, said means to hold resiliently including a spring located between said piston and cylinder means and said metering device;

means to convert the movement of said loop to indicate the linear movement of the object; and a limit switch which initiates the operation of said means to convert after said metering device is positioned by said means to move such that said loop is releasably attached to the object.

2. A measuring system for accurately measuring the linear displacement of a longitudinal object having a straight longitudinal side, such as a steel beam moving on a conveyor, comprising:

a metering device including a frame; a plurality of spaced pulleys rotatably mounted on said frame; a continuous loop trained for travel around said pulleys, a portion of the path of travel of said loop extending parallel to the straight side of the object; and means to releasably attach said loop to the object along the parallel portion of the path of said loop;

means to move said metering device reciprocally toward and away from the straight side of the object;

means to hold said metering system resiliently against the object;

means to convert the movement of said loop to indicate the linear movement of the object;

a limit switch which initiates the operation of said means to convert after said metering device is positioned by said means to move such that said loop is releasably attached to the object;

a second metering device located on the opposite side of said limit switch from said metering device, a second means to move said metering device reciprocally, a second means to convert, a second means to hold; and a central readout means for receiving the indication of linear movement from said metering device and said second metering device such that where the object has moved past one of said metering devices, the other metering device continues to measure the linear displacement of the object which is displayed on said central readout means.

3. A measuring system as claimed in claim 2 wherein each said metering device includes three of said pulleys arranged such that the path of travel of said loop is triangular; and each said metering device being such that said pulleys are sprocket wheels, said loop engages said sprocket wheels, and said means to releasably attach is a plurality of magnets which are located about the periphery of said loop.

4. A measuring system as claimed in claim 3 wherein each said means to convert includes a first encoder sprocket wheel coaxial with and connected to one of said sprocket wheels, a second encoder sprocket wheel which is connected to a rotatable shaft, and an encoder device for producing an electrical signal indicative of the rotation of said shaft.

5. A measuring system as claimed in claim 2 further including a means to clean debris from said magnets.

6. A measuring system as claimed in claim 5 wherein said means to clean includes a magnetic roller which rotatably engages said magnets on said loop and picks up debris therefrom, a brass bar which scrapes along the surface of said magnetic roller and dislodges the debris, and an air blowing means which blows away the debris dislodged by said brass bar.

7. A measuring system as claimed in claim 2 further including a loop take-up and an encoder take-up for each metering device.

8. A method of accurately measuring the linear displacement of a longitudinal object having a straight longitudinal side, such as a steel beam on a conveyor, comprising the steps of:

conveying the object to a first point;

moving a first metering device into resilient contact with the object, the metering device consisting of a support frame, a plurality of spaced pulleys, a continuous loop trained for travel about the pulleys with a portion of the path of travel of the loop extending parallel to the straight side of the object, and means to attach the loop to the object;

attaching the portion of the loop of the first metering device extending parallel to the straight side of the object to the object;

initiating measurement of the movement of the loop as the object reaches an initiating point;

indicating the linear displacement of the object from the initiating point by converting the measurement of the movement of the loop of the first metering device;

moving a second metering device into resilient contact with the object as the object reaches a second point which is on the opposite side of the initiating point from the first point;

attaching the loop of the second metering device extending parallel to the straight side of the object to the object; and indicating the linear displacement of the object from the initiating point after the object passes the first metering device by converting the measurement of movement of the loop of the second metering device.

* * * * *